United States Patent

Sakakibara et al.

[11] Patent Number: 4,618,948
[45] Date of Patent: Oct. 21, 1986

[54] APPARATUS FOR DETECTING OBSTRUCTIONS BEHIND VEHICLE

[75] Inventors: Hiroyuki Sakakibara, Hekinan; Shigeyuki Akita; Masao Kodera, both of Okazaki; Tsuyoshi Maeno, Chiryu, all of Japan

[73] Assignee: Nippon Soken, Inc., Nishio, Japan

[21] Appl. No.: 552,367

[22] Filed: Nov. 15, 1983

[30] Foreign Application Priority Data

Nov. 17, 1982 [JP] Japan ................................. 57-201757

[51] Int. Cl.$^4$ ............................................. G01S 15/93
[52] U.S. Cl. ..................................... 367/104; 340/904; 367/909
[58] Field of Search ................. 367/104, 909; 340/901, 340/904

[56] References Cited

U.S. PATENT DOCUMENTS

| | | | |
|---|---|---|---|
| 4,278,962 | 7/1981 | Lin | 367/909 X |
| 4,347,591 | 8/1982 | Stembridge et al. | 367/104 |
| 4,467,313 | 8/1984 | Yoshino et al. | 367/909 X |
| 4,490,716 | 12/1984 | Tsuda et al. | 367/909 X |

Primary Examiner—Richard A. Farley
Attorney, Agent, or Firm—Cushman, Darby & Cushman

[57] ABSTRACT

An apparatus for detecting obstructions behind a vehicle, employing ultrasonic waves is disclosed. The apparatus comprises an ultrasonic transmitting and receiving device disposed on the rear portion of the vehicle, an electric motor for rotating the transmitting and receiving device at a constant velocity, an angle sensor for detecting the rotating angle of the transmitting and receiving device and a sonar circuit for emitting ultrasonic waves through the transmitting and receiving device at predetermined rotating angles, receiving ultrasonic waves reflected from obstructions through the transmitting and receiving device at predetermined rotating angles and measuring the distance to the obstructions from the time taken from the transmission to the reception of the ultrasonic waves. According to the apparatus of the present invention, the distances to obstructions in every region behind the vehicle can be accurately and easily measured by rotating a single transmitting and receiving device by means of the electric motor at a constant velocity.

10 Claims, 13 Drawing Figures

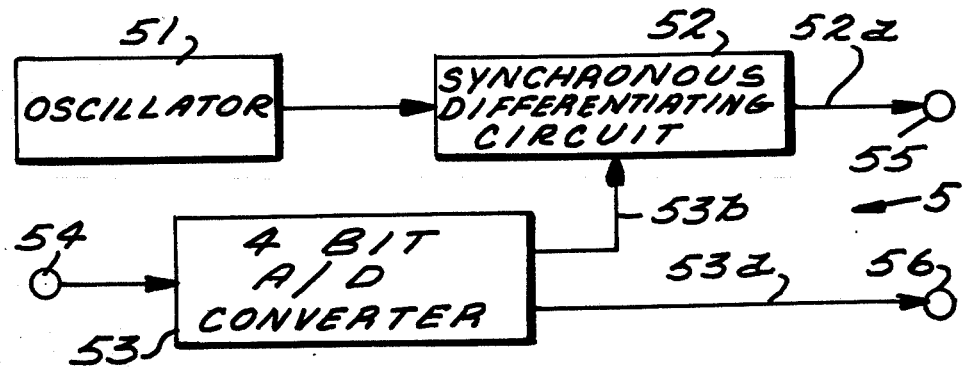
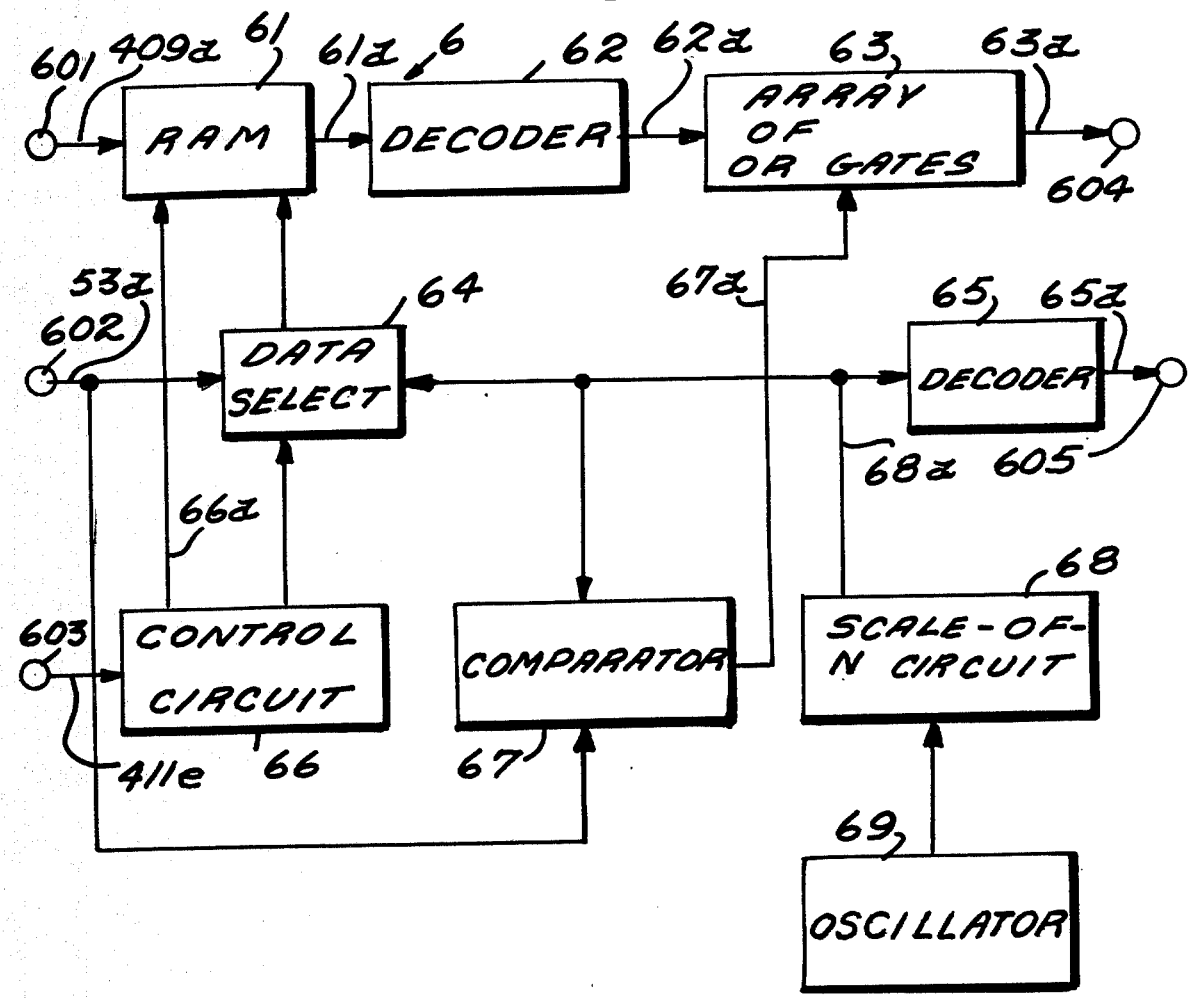

APPARATUS FOR DETECTING OBSTRUCTIONS BEHIND VEHICLE

BACKGROUND OF THE INVENTION

The present invention relates to an apparatus for measuring and displaying the distances to obstructions behind a vehicle and, more particularly, to an ultrasonic obstruction detecting apparatus for measuring the time taken by ultrasonic waves emitted from the apparatus to return to it after reflection by the obstructions to determine the distances to the obstructions.

Conventional apparatuses of this kind consist of ultrasonic transmitting and receiving devices firmly fixed to the rear bumper of a vehicle and a display unit mounted in the interior of the vehicle for displaying the distances to obstructions in the form of bar graphs, for example. These apparatuses making use of ultrasonic waves are cheaper than television camera or the like and require less maintenance for removing dirt and dust. Further, these can be used even when it is raining or snowing or at night. Another advantage is that accurate measurement of distance is possible.

Unfortunately, the aforementioned ultrasonic obstruction detecting apparatuses need an array of ultrasonic transmitting and receiving devices of the same kind to sense the positions of obstructions in every region behind a vehicle. Accordingly, a large space is required to install the array of the devices, and such apparatuses are quite expensive to fabricate.

SUMMARY OF THE INVENTION

It is an object of the present invention to provide an ultrasonic obstruction detecting apparatus which is simple in structure and capable of accurately measuring the distances to obstructions in every region behind a vehicle.

It is another object of the invention to provide an ultrasonic obstruction detecting apparatus which can detect obstructions in every region behind a vehicle with only one ultrasonic transmitting and receiving device and display the distances to all the obstructions.

Other objects, advantages and features of the invention will be apparent from the following description of the preferred embodiments taken in conjunction with the accompanying drawings.

An apparatus for detecting obstructions behind a vehicle according to the present invention comprises: an ultrasonic transmitting and receiving device mounted to the rear portion of the vehicle, a scanning means for causing the ultrasonic device to scan the obstruction detecting region behind the vehicle, an ultrasonic emitting and receiving means for emitting ultrasonic waves at predetermined scanning angles via the transmitting and receiving device and for receiving the waves reflected from obstructions via the transmitting and receiving device, a distance measuring means for measuring the time taken from the transmission to the reception to determine the distances to the obstructions, a scanning position detecting means for detecting the scanning positions of the transmitting and receiving device, and a display means for displaying the distances from the scanning positions to the obstructions.

In the apparatus for detecting obstructions behind a vehicle in accordance with the present invention, since the ultrasonic transmitting and receiving device is equipped with the scanning means, it is possible to detect obstructions in every region behind the vehicle. Consequently, only a small space is required to install it, and it is economical to fabricate.

BRIEF DESCRIPTION OF THE DRAWINGS

FIGS. 1 through 10 show an embodiment of the present invention and in which:

FIG. 1 is a block diagram of the whole construction of an apparatus for detecting obstructions behind a vehicle;

FIG. 2 is a cross-sectional view of the apparatus of FIG. 1, for showing the manner in which an ultrasonic transmitting and receiving device rotatably supported and driven by an electric motor is mounted on the rear bumper of the vehicle;

FIG. 3 is a view for illustrating the structure for supplying electric power to the ultrasonic oscillators of the apparatus shown in FIG. 1;

FIG. 4 is a block diagram of the sonar circuit of the apparatus shown in FIG. 1;

FIG. 5 is a block diagram of the angle sensor interface circuit of the apparatus shown in FIG. 1;

FIG. 6 is a block diagram of the display signal processing circuit of the apparatus shown in FIG. 1;

FIG. 7 is a block diagram of the display unit of the apparatus shown in FIG. 1;

FIG. 8 is a circuit diagram of an array of OR gates;

FIG. 9 is a time chart showing signal waveforms in the sonar circuit of the apparatus shown in FIG. 1;

FIG. 10 is a front elevation of the display unit of the apparatus shown in FIG. 1, for showing the appearance of the unit;

FIG. 12 is a cross-sectional view showing the manner in which the ultrasonic transmitting and receiving device, which is reciprocated through a half revolution by means of a link mechanism, is mounted on the rear bumper of a vehicle in accordance with still another embodiment of the invention; and FIG. 13 is a flowchart of a computer program for illustrating yet another embodiment of the invention.

DETAILED DESCRIPTION OF THE PREFERRED EMBODIMENTS

FIGS. 1 through 10 show an embodiment of an apparatus for detecting obstructions behind a vehicle of the invention. The construction and the operation of the apparatus are hereinafter described in detail with reference to the figures.

Figure 1:
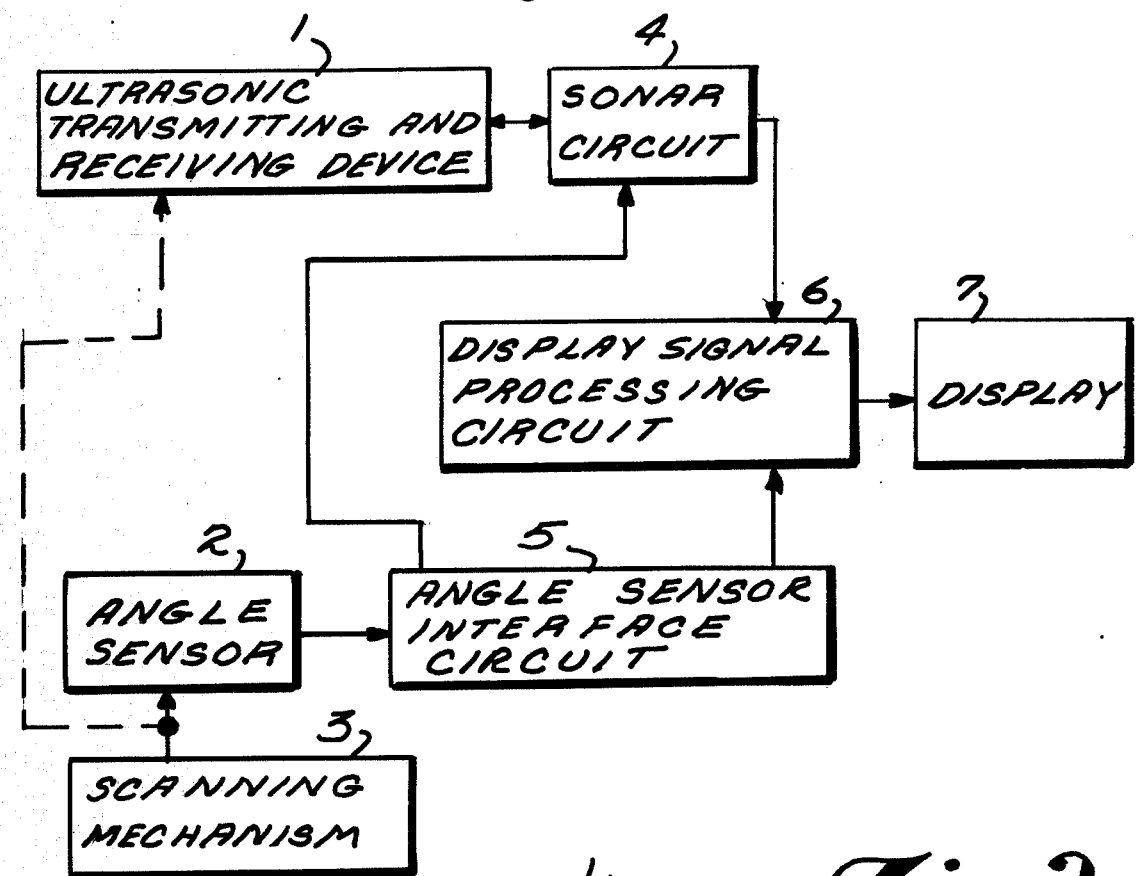

FIG. 1 is a block diagram of the apparatus of the invention, in which an ultrasonic transmitting and receiving device 1 is mounted on the rear portion of a vehicle. A scanning mechanism 3 rotates the device 1 to scan the obstruction detecting region behind the vehicle. The angle through which the device 1 has rotated is detected by an angle sensor 2 serving as a scanning position detecting means. A sonar circuit 4 causes the device 1 to emit ultrasonic waves and receives ultrasonic waves reflected from obstructions to measure the distances to the obstructions. That is, the sonar circuit 4 acts as an ultrasonic emitting and receiving means and also as a distance measuring means. An angle sensor interface circuit 5 converts the angle signal in analog form delivered by the angle sensor 2 into digital form and produces a trigger signal to the sonar circuit 4 for initiating the operation of the circuit 4. A display signal processing circuit 6 receives the output signals from the interface circuit 5 and from the sonar circuit 4 to store the distances to obstructions at each angular position of the transmitting and receiving device 1 in its memory, and the circuit 6 delivers a display signal to a display unit 7 installed in the interior of the vehicle.

Figure 2:
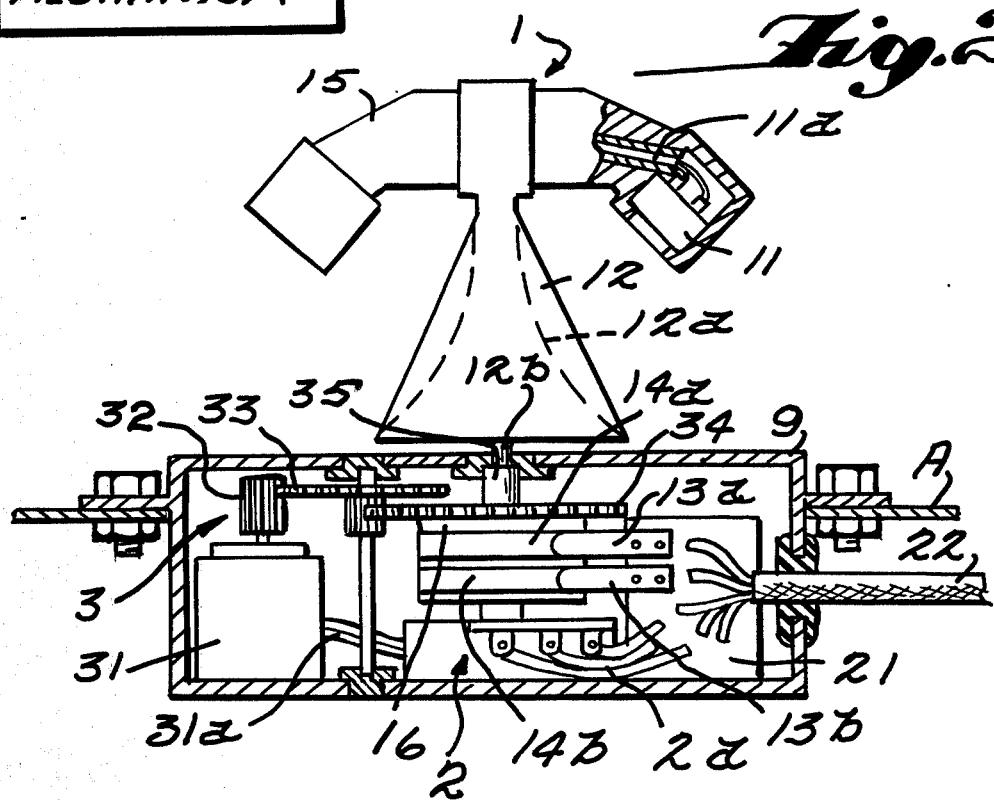
Figure 3:
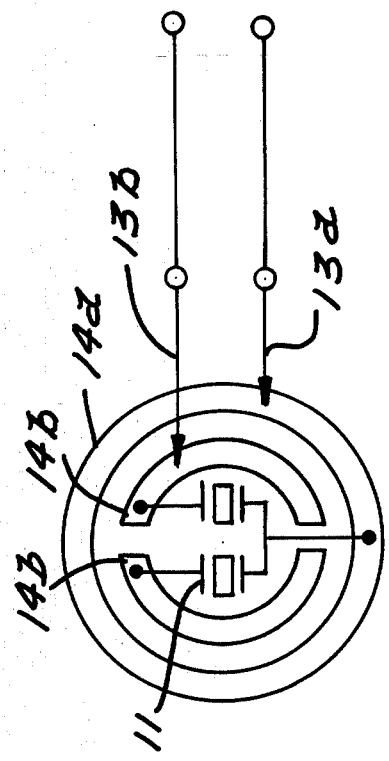

As shown in FIG. 2, the ultrasonic transmitting and receiving device 1, the angle sensor 2 and the scanning mechanism 3 are mounted to the rear bumper A of the vehicle as a unit. In particular, a housing 9 is bolted to the bumper A, and the sensor 2 and the mechanism 3 are received in the housing 9. The device 1 is installed upright on the upper surface of the housing 9.

The frame of the ultrasonic transmitting and receiving device 1 is made of a trapezoidal base 12 and arms 15 protruding to opposite sides from the upper end of the base. The arms 15 are bent downward, and the opposite ends of the arms each has an ultrasonic vibrator 11 therein. The side surfaces of the base 12 which are opposite to the arms 15 are each shaped into a paraboloid 12a as indicated by the broken lines. The vibrators 11 face toward their respective paraboloids 12a and are located at the foci of the paraboloids. Ultrasonic waves emitted from the vibrators 11 are reflected by the paraboloids 12a and then directed horizontally. The base 12 has a shaft 12b, which extends downwardly from the center of the underside of the base and is securely connected to a shaft 35 that is rotatably mounted in the housing 9. The transmitting and receiving device 1 is therefore held by the shaft 35 so as to be rotatable about it.

The lower end of the shaft 35 is connected to a potentiometer 2 serving as an angle sensor which delivers an angle signal corresponding to the angular position of the shaft 35. Also mounted in the housing 9 is an electric motor 31 serving as a scanning mechanism. The shaft of the motor has a gear 32 mounted thereon, and the gear 32 is connected via a gear 33 with a gear 34 mounted on the shaft 35. Therefore, the rotating force of the motor 31 is transmitted to the shaft 35, so that the shaft 35 and the device 1 secured to the shaft are rotated at a constant velocity.

A cylindrical member 16 made of an electrically insulating material is mounted to the aforementioned shaft 35 and in contact with the gear 34. Strips of electrodes 14a and 14b are formed on the outer periphery of the cylindrical member in parallel relation to each other. Brushes 13a and 13b extending from a printed circuit board 21 are in contact with the electrodes 14a and 14b, respectively, which are connected with the ultrasonic vibrators 11 via lead wires 11a. These brushes 13a and 13b are connected via the board 21 and through a cable 22 to the sonar circuit 4 (see FIG. 1) disposed outside of the housing. The connections of the brushes 13a and 13b with the electrodes 14a and 14b are diagrammatically shown in FIG. 3. One end of each vibrator 11 is connected to the electrode 14a disposed around the whole outer periphery of the cylindrical member 16 (see FIG. 2), while the other end is connected to an electrode 14b disposed on half of the outer periphery of the cylindrical member 16. Thus, the vibrators 11 are alternately selected by the brushes 13a and 13b each time the transmitting and receiving device 1 makes a half revolution. More specifically, only one of the vibrators 11 of the rotating device 1 which faces the detecting region is connected to the sonar circuit 4 to transmit and receive ultrasonic waves.

Referring to FIG. 2, the motor 31 is coupled to an external power supply (not shown) via lead wires 31a, the printed circuit board 21 and the cable 22. Also, the potentiometer 2 is supplied with electric power from a regulated power supply circuit (not shown) on the printed circuit board 21. The output signal from the potentiometer is applied via the cable 22 to the angle sensor interface circuit 5 (see FIG. 1) mounted outside.

Figure 4:
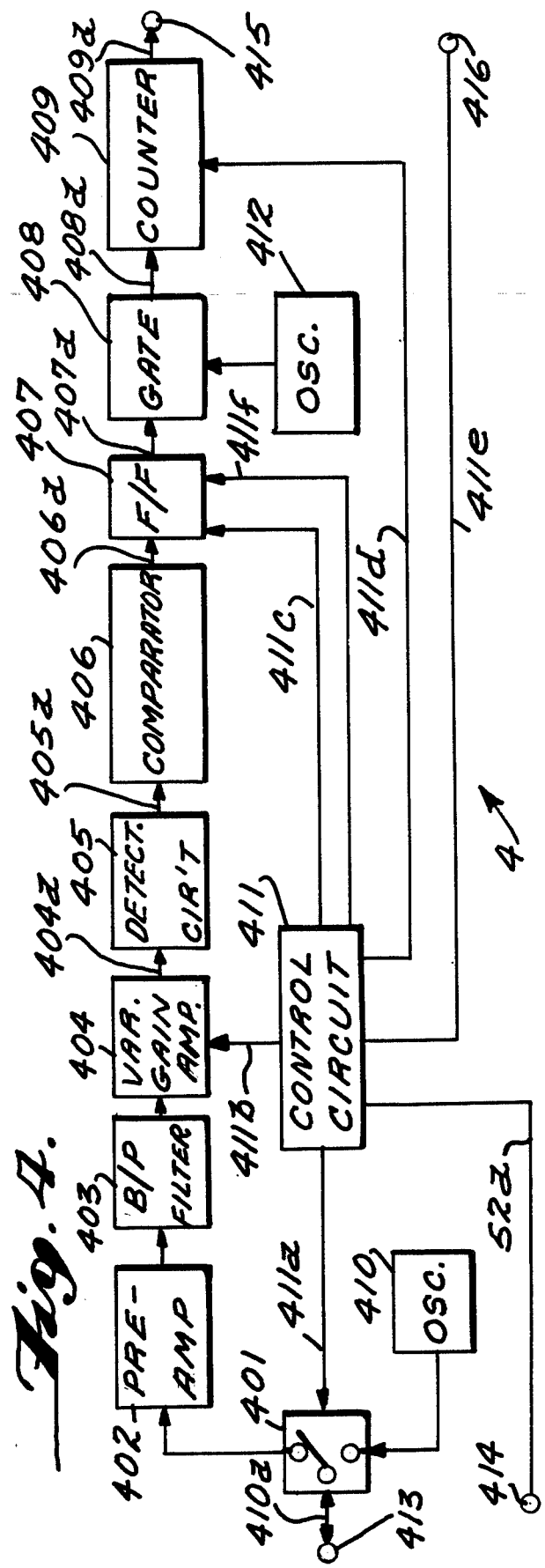

The constructions of the sonar circuit 4 and the interface cirduit 5 are shown in FIGS. 4 and 5, respectively. Referring first to FIG. 4, the sonar circuit has an analog switch 401, a preamplifier 402, a bandpass filter 403, a variable-gain amplifier 404, a detecting circuit 405, a comparator 406, a flip-flop 407, a gate 408, a counter 409, oscillators 410 and 412, and a control circuit 411. The oscillation frequency of the oscillator 410 and the center frequency of the passband of the bandpass filter 403 are set at the frequency used for the ultrasonic vibrators 11. The analog switch 401 switches to another state in response to the output signal 411a from the control circuit 411 and delivers the output pulses 410a from the oscillator 410 from its terminal to the vibrators 11 (see FIG. 2) for producing ultrasonic waves. The switch also functions to deliver the signal indicating a reflected sound and received at a terminal 413 to the preamplifier 402. The magnitude of the gain of the variable-gain amplifier 404 is controlled by the output signal from the control circuit 411. Specifically, while the echo of the transmission from either vibrator 11 remains, the gain assumes a minimum value. Thereafter, the gain is increased in stepwise fashion to compensate for the attenuation of the reflected sound which results when the distance to an obstruction is long. The flip-flop 407 is set by the output signal 411c from the control circuit 411 and reset by either the output signal 406a from the comparator 406 or the output signal 411f from the control circuit 411.

The gate 408 is enabled by the output signal 407a from the flip-flop 407, during which time the output pulses 408a from the oscillator 412 are applied to the counter 409, which counts the number of the pulses 408a to deliver a distance signal 409a from its terminal 415. The counter 409 is reset by the output signal 411d from the control circuit 411, which is started by the trigger signal 52a applied to its terminal 414 from the angle sensor interface circuit 5 (see FIG. 1) to produce the aforementioned signals 411a, 411b, 411c, 411d and 411f for controlling the whole configuration of the sonar circuit 4. Upon completion of measurement of a distance, the control circuit 411 produces a measurement end signal 411e from its terminal 416.

Referring next to FIG. 5, the angle sensor interface circuit 5 has an oscillator 51 producing a frequency of tens of KHz, a synchronous differentiating circuit 52 and a four-bit analog-to-digital converter 53. The output signal applied to a terminal 54 from the potentiometer 2 (see FIG. 2) is converted into digital form by the converter 53 and then delivered as an angle signal 53a from a terminal 56. Applied to the synchronous differentiating circuit 52 is the least significant bit signal 53b from the A/D converter. Each time the LSB signal 53b changes its state, the differentiating circuit 52 produces a trigger signal 52a, which is fed to the sonar circuit 4 from a terminal 55. The potentiometer produces the same output whenever it rotates through an additional angle of 180°. Consequently, the bit signal 53b from the A/D converter 53 is reversed each time the potentiometer 2 moves through an additional angle of about 11° (≃180°/16).

Figure 9:
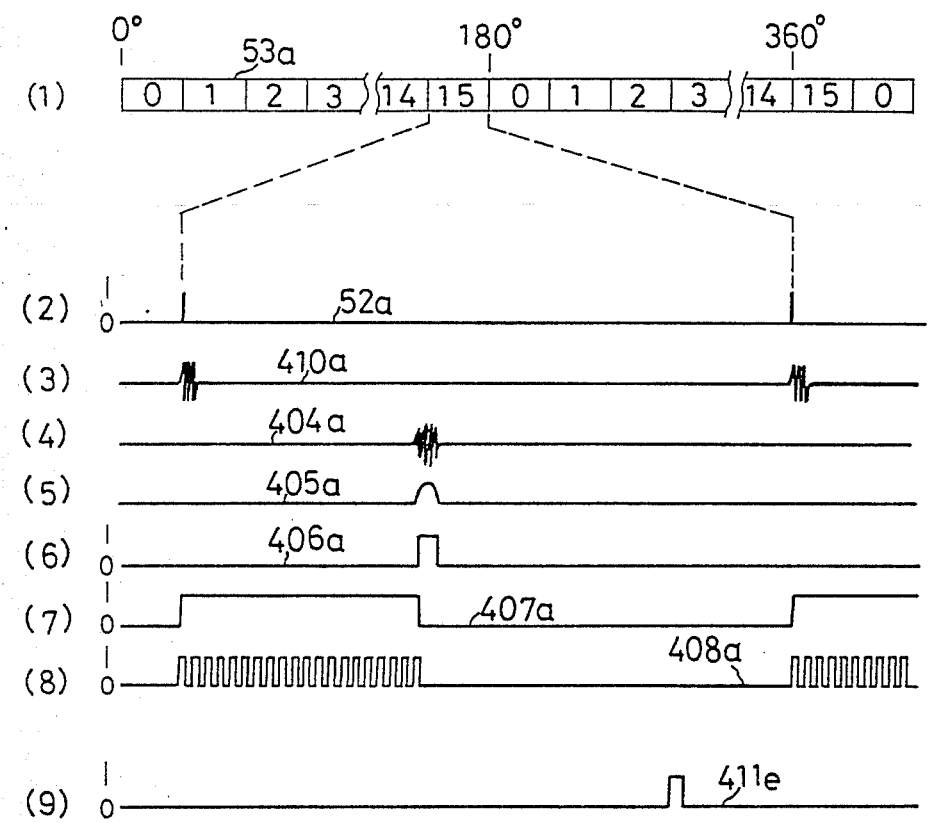

FIG. 9 is a time chart of the signals described above. FIG. 9 (1) shows changes in the angle signal 53a corresponding to the angular position of the transmitting and receiving device 1. The numerals in FIG. 9 (1) are digital representations of the angle signal 53a at predetermined angular positions. FIGS. 9 (2) through 9 (9) indicate the timings at which the signals 52a, 410a, 404a, 405a, 406a, 407a, 408a and 411e are produced from the sonar circuit 4 (see FIG. 4), respectively, in the angular interval which is indicated by the phantom lines and in which the angular signal 53a represents numeral 15.

The operation of the sonar circuit 4 is now described with reference to the foregoing figures. The control circuit 411 which receives the trigger signal 52a actuates the analog switch 401 to switch the control circuit to the side of the oscillator 410 for supplying the pulse signals 410a to the ultrasonic transmitting and receiving device 1 (see FIG. 2). At the same time, the flip-flop 407 is set so that the output signal 407a is brought to state "1". At that time, the counter 409 is reset. Then, the analog switch 401 is switched to the side of the preamplifier 402 to receive the reception signal. The reception signal is filtered and then amplified into the signal 404a. This signal 404a is detected by the detecting circuit 405, and when the detected signal 405a exceeds a predetermined level, the comparator 406 produces the signal 406a to reset the flip-flop 407 as indicated by 407a.

The flip-flop 407 is set during the period beginning with a transmission of ultrasonic waves and ending with a reception of reflected waves. During this period, the output pulses from a oscillator 412 are applied to the counter 409 via a gate 408, and the number of the signals 408a is counted. Therefore, the counter 409 delivers a distance signal 409a proportional to the distance to an obstruction. After a lapse of the time corresponding to the maximum measurable distance, the control circuit 411 produces a control signal 411f to reset the flip-flop 407, whether the output signal 406a is present or not. At the same time, the control circuit 411 produces the measurement end signal 411e.

Referring to FIG. 6, there is shown the construction of the display signal processing circuit 6. The processing circuit 6 has a random access memory 61 for storing the distances to obstructions at various angular positions of the ultrasonic transmitting and receiving device 1. The circuit 6 also has decoders 62 and 65 for decoding k-bit unput into $2^k$ outputs, an array of OR gates 63, a data selector 64, a control circuit 66, a comparator 67, a scale-of-n circuit 68 and an oscillator 69.

Figure 8:
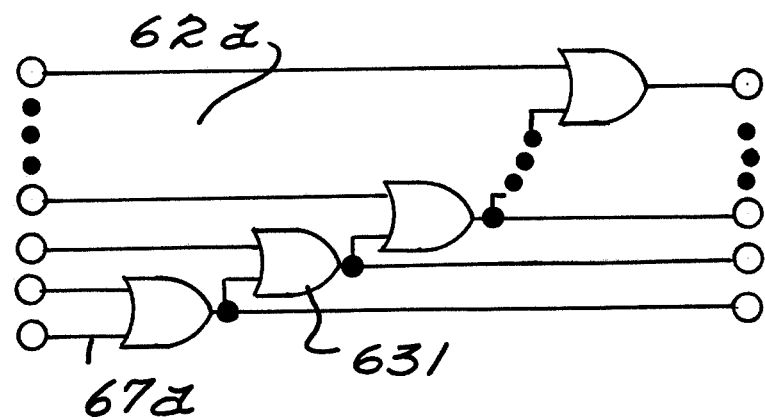

As shown in FIG. 8, the array of OR gates 63 consists of two input OR gates 631 connected together in cascade. The least significant bit of the output signal 62a from the decoder 62 (see FIG. 6) is coupled to the first stage of the OR gates 631, while the most significant bit is coupled to the final stage of the OR gates 631. The remaining input terminal of the first stage of the OR gates 631 is supplied with the output signal 67a from the comparator 67.

Referring back to FIG. 6, the scale-of-n circuit 68 is caused to count the number of the output pulses from the oscillator 69 and deliver an angle address signal 68a by appropriately selecting the value of n. In the present illustrative embodiment, the value of n is set at 16, and the value of the angle address signal 68a changes periodically from 0 to 15.

When the distance measuring end signal 411e is applied to the terminal 603 of the control circuit 66, the circuit 66 controls the data selector 64 to allow the angle signal 53a applied to the terminal 602 to be fed to the RAM 61. Then, the control circuit produces a writing signal 66a to the RAM 61 so that the distance signal 409a applied to the terminal 601 may be written to the address designated by the angle signal 53a. After completion of the writing operation, the angle address signal 68a from the scale-of-n circuit 68 is furnished to the RAM 61 via the data selector 64. As the address signal 68a varies periodically as described above, the distance signals 409a previously stored at the addresses designated by the signal 68a are successively read, resulting in a signal 61a.

The decoder 62 produces the output signals 62a in which bits corresponding to the read distance signals 61a assume state "1". The signals 62a are converted into displaying distance signals 63a by the array of OR gates 63, and then the resultant signals are delivered from a terminal 604. In the displaying distance signals 63a, all the bits more significant than the aforementioned bits assume level "1". The angle address signal 68a from the scale-of-n circuit 68 is also applied to the decoder 65, which delivers a displaying angle signal 65a, in which the bits corresponding to the value of the address signal 68a assume state "1", from its terminal 605. The comparator 67 compares the angle signal 53a with the angle address signal 68a and produces an output signal 67a when both coincide with each other. The signal 67a causes the array of OR gates 63 to produce the displaying distance signals whose all bits are at state "1". In the present illustrative embodiment, the displaying distance signal 63a consists of 10 bits, whereas the displaying angle signal consists of 16 bits.

Figure 7:
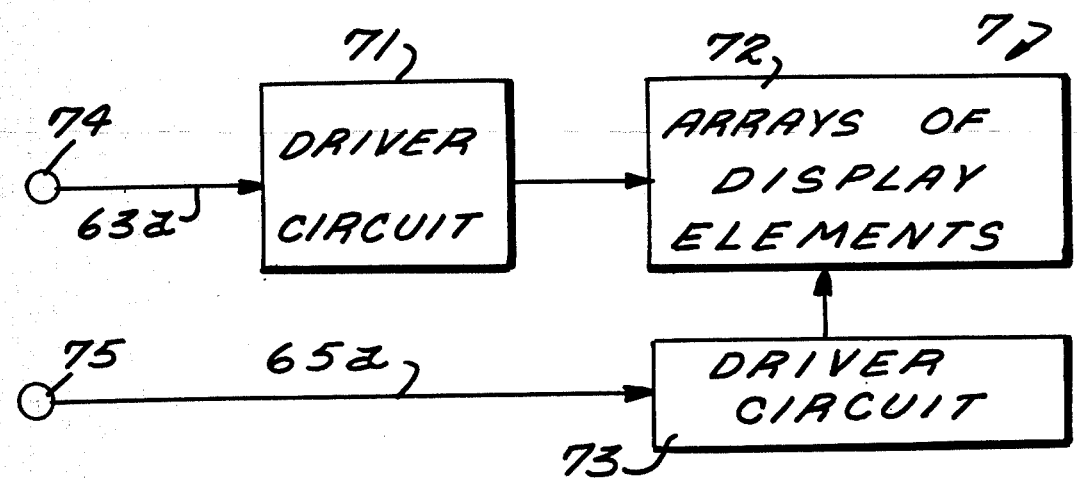

Referring next to FIG. 7, the construction of the display unit 7 is shown. The unit has driver circuits 71, 73 and arrays of display elements 72. Light emitting diodes, fluorescent character display tubes, liquid crystals or the like may be used as the display elements. The display elements of the arrays 72 are connected in matrix configuration, and the elements which are selected by both the displaying distance signal 63a applied to the terminal 74 and the displaying angle signal 65a applied to the terminal 75 are turned on. More specifically, the bits of the signal 63a assuming state "1" select some rows of the matrix, while the bits of the signal 65a assuming state "1" select some columns of the matrix. Thus, the display elements at the intersections of the rows and columns light up.

Figure 10:
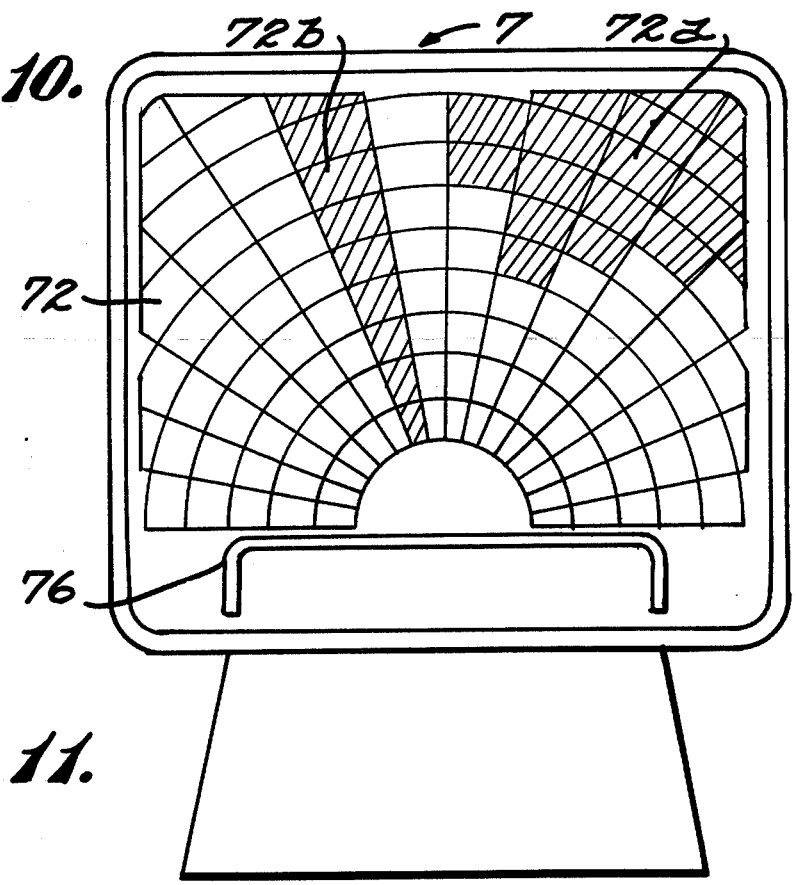

FIG. 10 is a front elevation of the above-described display unit 7, which is installed in the rear tray in the interior of the vehicle or in other place that the driver can watch when the vehicle moves backward. The lateral extent of the vehicle is indicated by numeral 76. The arrays of display elements 72 are disposed only in the lateral extent and in its vicinity. The arrays of display elements 72 are radially partitioned into 16 equal sections each of which corresponds to each bit of the displaying angle signal 65a. The arrays 72 are also concentrically partitioned into at most 10 equal portions each of which corresponds to each bit of the displaying distance signal 63a.

When the scale-of-n circuit 68 shown in FIG. 6 produces the angle address signals 68a in succession, the angle display signal 65a and the distance display signal 63a are delivered to the display unit 7 accordingly. Then, the display elements of the arrays 72 which are selected by the signals 63a and 65a light up as denoted by the hatchings in FIG. 10. In the distance display signal 63a all the bits more significant than the bits corresponding to the distances to obstructions are at state "1" as described previously. Therefore, the display elements representing the front ends of the obstructions and the following displaying elements are all turned on as indicated by 72a. Also, when the scanning angle of the ultrasonic transmitting and receiving device 1 coincides with the angle address signal 68a, all of the bits in the distance display signal assume state "1", whereby all of the display units selected by the angle display signal 65a light up as indicated by 72b in FIG. 10. In this way, the detecting direction of the device 1 as well as the positions of obstructions in every direction near the rear portion of the vehicle is displayed.

As hereinbefore described, the novel apparatus for detecting obstructions behind a vehicle is equipped with the single ultrasonic transmitting and receiving device, which is disposed on the rear portion of the vehicle, rotates at a given velocity and incorporates the pair of ultrasonic vibrators to alternately transmit and receive ultrasonic waves for scanning the whole obstruction detecting region behind the vehicle. The positions of the obstructions in the region are displayed on the display unit in the interior of the vehicle. Accordingly, it is possible to move the vehicle backward quite safely and smoothly by virtue of the novel apparatus. Further, because only one transmitting and receiving device disposed on the rear end of the vehicle is capable of covering the whole detecting region, it is quite advantageous economically.

Figure 11:
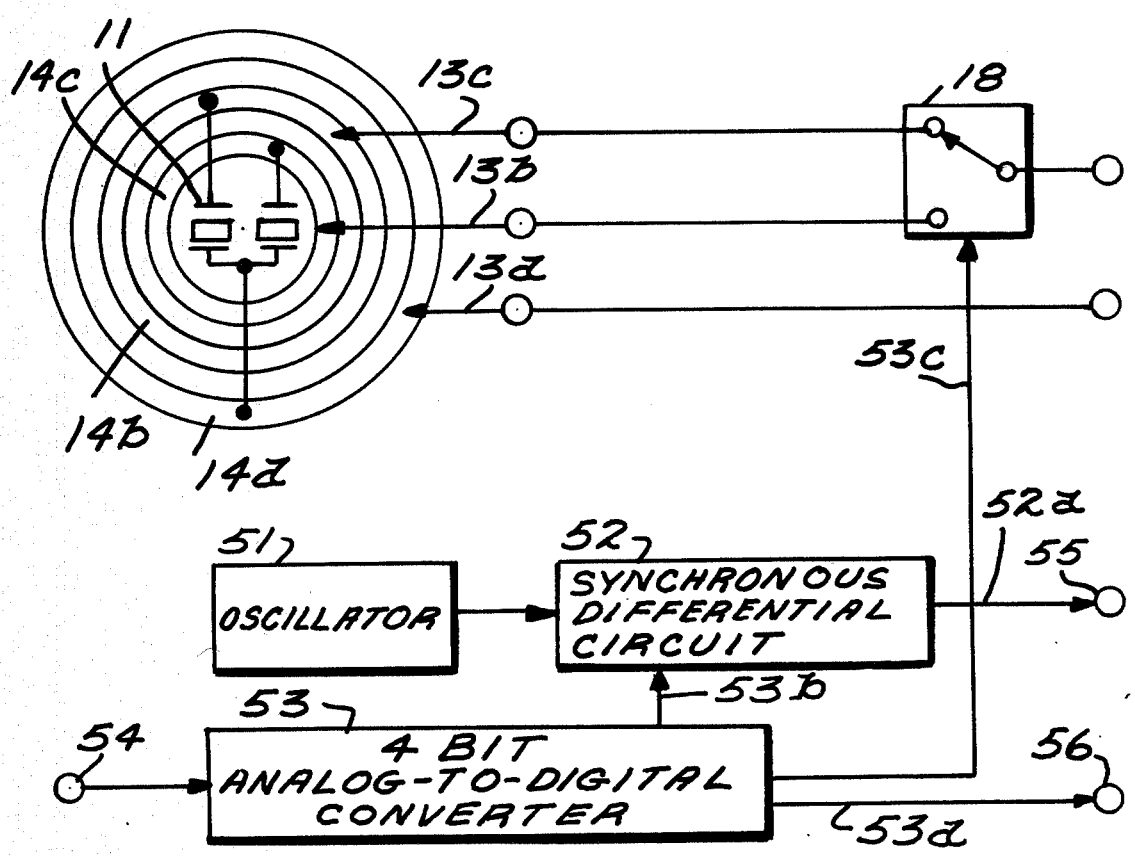
FIG. 11 is a circuit diagram of the circuit for selectively supplying electric power to the ultrasonic oscillators of another embodiment of the invention.

Referring to FIG. 11, there is shown another embodiment of the apparatus for detecting obstructions behind a vehicle of the invention. This apparatus includes an analog switch 18 for selectively using the two vibrators 11 of the ultrasonic transmitting and receiving device 1. The terminals of the vibrators 11 are connected to electrodes 14a, 14b and 14c, respectively. These electrodes are in contact with brushes 13a, 13b and 13c, respectively. In the present example, the potentiometer 2 (see FIG. 2) has a period of 360°. The analog-to-digital converter 53 functions to converts its input analog signal into digital form represented by 5 bits. The most significant bit signal 53c of the resultant digital signals shifts the switch 18 to other state. In this way, the vibrators 11 are used alternately for every 180° rotation of the transmitting and receiving device 1. In the present embodiment the switching operation of the vibrators 11 is electrically effected, and therefore it has a higher reliability than the previous embodiment.

Referring to FIG. 12, there is shown still another embodiment of the apparatus for detecting obstructions behind a vehicle of the invention. In this apparatus, the ultrasonic transmitting and receiving device 1 is equipped with only one vibrator 11 which turns in a reciprocating manner facing to the detecting region. A gear 39 which is driven by the electric motor 31 via the gears 32 and 33 is provided with an arm 36 rotating together with the gear 39. The revolving shaft 35 of the device 1 is also provided with an arm 38. Still another arm 37 is mounted between the front ends of the arm 38 and of the arm 37, the ends of the arm 37 being pivotally mounted to the arms 36 and 38, respectively. Thus, these arms 36, 37 and 38 constitute a link mechanism which converts the rotary motion of the gear 39 into reciprocation of the revolving shaft 35. This structure enjoys the same advantages as the first-mentioned embodiment and requires only one vibrator 11 without necessitating any switching circuit.

Although in the embodiment hereinbefore described the ultrasonic transmitting and receiving device is rotated by the mechanism comprising a motor and gears and with or without a link mechanism, it is equally possible to directly rotate the ultrasonic device by a motor. Also, a mechanism consisting of a combination of a solenoid and a link mechanism may be used to turn the device. Further, a shaft encoder may be employed as the angle sensor instead of the potentiometer.

FIG. 13 is a program flowchart for illustrating yet another embodiment of the apparatus for detecting obstructions behind a vehicle of the invention, in which a microcomputer is used instead of the display signal processing circuit 6. The microcomputer should take the form having two input ports, three output ports and one interrupt demand terminal. The input ports receive the angle signal 53a and the distance signal 409a. The output ports deliver the displaying angle signal 65a and the displaying distance signal 63a. The interrupt demand terminal receives the distance measurement end signal 411e.

In the flowchart, $\theta_i$ indicates the angle signal 53a which is read upon occurrence of the distance measurement end signal, and $r(\theta_i)$ is the distance signal 409a at this time. In the present example, $\theta_i$ can assume a value from 0 to 15. Indicated by $\theta$ is a counter whose contents are increased by one for every cycle of the main program. In this specific example, when the contents exceed 15, the counter is reset. $D(\theta)$ indicates the displaying angle signal produced by decoding the angle signal. $D(r(\theta))$ indicates the displaying distance signal which results by decoding the distance signal. $A(\theta)$ indicates the minimum possible distance between the vehicle and an obstruction at a given angular position.

In step 81, the distance signal $r(\theta_i)$ is stored in the address of the memory specified by the angle signal $\theta_i$. In step 82, the value of the angle signal $\theta_i$ is compared with the contents of the counter $\theta$. If both coincide, the procedure proceeds to step 84. If both do not coincide, the procedure proceeds to step 83, in which the displaying angle signal $D(\theta)$ and distance signal $D(r(\theta))$ specified by the counter $\theta$ are delivered as the displaying angle signal 65a and the displaying distance signal 63a, respectively. In process 84, all of the bits of the signal 63a, or the displaying distance signal $D(r(\theta))$, the caused to assume state "1" and then they are delivered. In step 85, the distance signal $r(\theta)$ is compared with the minimum allowable distance $A(\theta)$, and if the distance is less than the distance $A(\theta)$, a warning device (not shown) is caused to emit a warning signal in process 86. The present embodiment also yields the same advantages as the first-mentioned embodiment.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An apparatus for detecting obstructions behind a vehicle, the apparatus comprising:
   an ultrasonic transmitting and receiving device disposed on the rear portion of the vehicle;
   a scanning means for causing said transmitting and receiving device to scan the obstruction detecting region behind the vehicle;

an ultrasonic emitting and receiving means for emitting ultrasonic waves at given scanning positions via said ultrasonic transmitting and receiving device and for receiving the waves reflected from obstructions via said ultrasonic transmitting and receiving device;

a distance measuring means for measuring the time taken from the transmission to the reception of the ultrasonic waves to determine the distances to the obstructions;

scanning position detecting means for detecting the positions at which said transmitting and receiving device scans; and a display means for displaying the distances to the obstructions at said given scanning position;

the ultrasonic transmitting and receiving device of said apparatus including: a shaft rotatably and vertically mounted to the rear portion of the vehicle; at least one ultrasonic vibrator rotatable together with said shaft; and a reflecting plate formed opposite to the vibrator and around the shaft whereby the ultrasonic waves produced by said ultrasonic vibrator are reflected by said reflecting plate and then directed radially outwardly, and wherein said reflecting plate also reflects the waves which are reflected back by obstructions to said ultrasonic vibrator for reception.

2. An apparatus for detecting obstructions behind a vehicle as set forth in claim 1, wherein said ultrasonic vibrator includes two vibrators which are mounted to said shaft at diametrically opposite positions from the shaft.

3. An apparatus for detecting obstructions behind a vehicle as set forth in claim 1, wherein said scanning means includes a mechanism for continuously rotating said shaft in one direction.

4. An apparatus for detecting obstructions behind a vehicle as set forth in claim 3, wherein said scanning means includes an electric motor for rotating said shaft.

5. An apparatus for detecting obstructions behind a vehicle as set forth in claim 1, wherein said scanning position detecting means includes a switching means for selectively connecting said ultrasonic vibrators with said ultrasonic emitting and receiving means when the vibrators are directed backward.

6. An apparatus for detecting obstructions behind a vehicle as set forth in claim 1, wherein said scanning means includes a mechanism for reciprocating said shaft through a half revolution.

7. An apparatus for detecting obstructions behind a vehicle as set forth in claim 6, wherein said scanning means includes a link mechanism and an electric motor connected to the link mechanism which includes an arm protruding from said shaft, the arm serving as one of the link arms of the link mechanism, whereby the continuous rotation of the motor is converted into reciprocating motion by the link mechanism.

8. An apparatus for detecting obstructions behind a vehicle as set forth in claim 1, wherein said scanning position detecting means comprises an angle sensor connected to said shaft so as to be rotatable together with same for sensing the arrival of said ultrasonic transmitting and receiving device at a predetermined angular position, and a means for producing a trigger signal to said ultrasonic emitting and receiving means upon such sensing of the arrival for emitting and receiving purposes.

9. An apparatus for detecting obstructions behind a vehicle as set forth in claim 8, wherein said display means comprises a memory means for storing the distances to the obstructions at the angular positions of said ultrasonic transmitting and receiving device, and a display panel for displaying the distances at the angular positions which are stored in the memory means.

10. An apparatus for detecting obstructions behind a vehicle as set forth in claim 9, wherein said display panel is radially partitioned into sections crresponding to the angular positions of said ultrasonic transmitting and receiving device, each of the sections having a radial array of display elements to display the distances to the obstructions at the angular positions.

* * * * *